Dec. 27, 1966    H. L. ERICKSON ETAL    3,294,290
VALVE ASSEMBLY CONTROLLING FLOW INTO, AND DISCHARGE
FROM, A FLUID MEASURING CHAMBER
Filed April 6, 1965
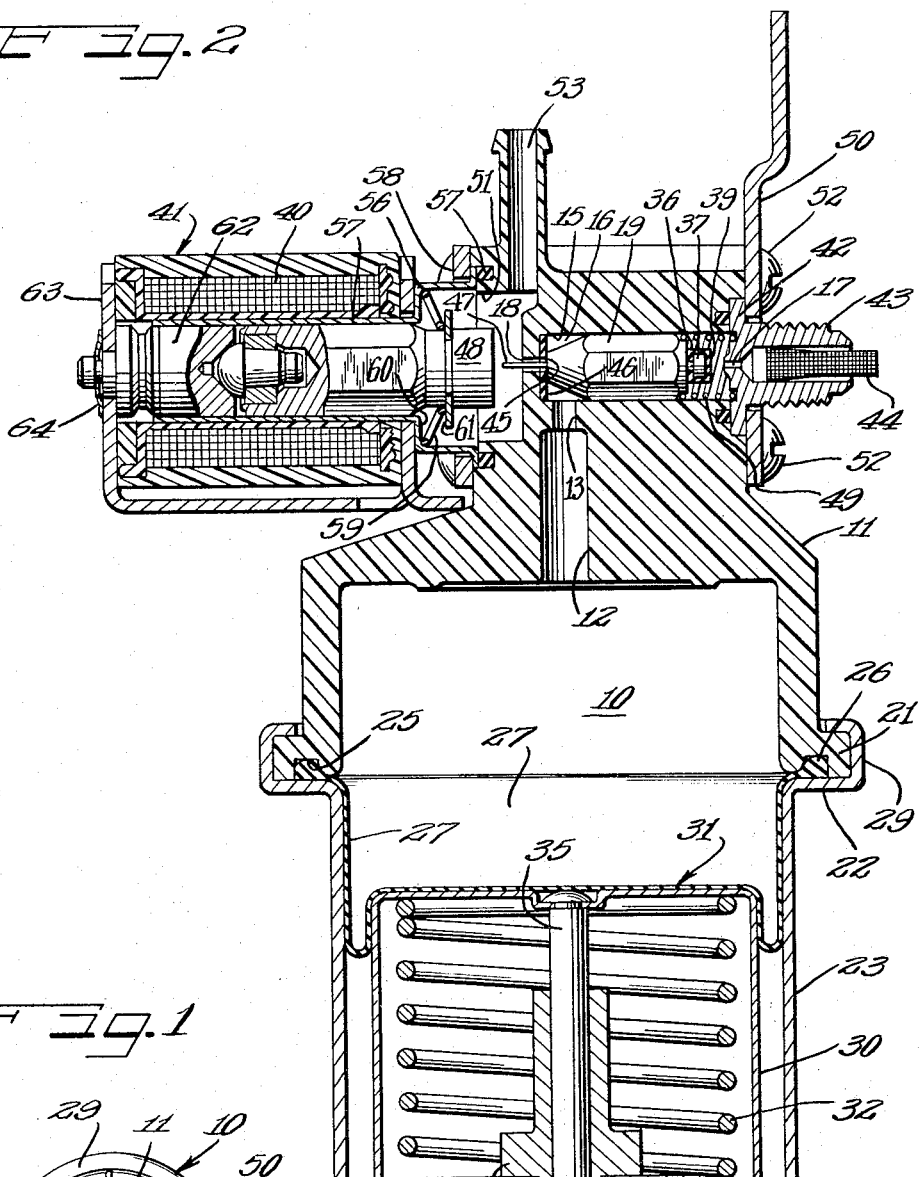
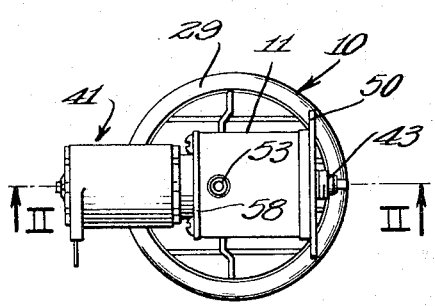
INVENTORS
Howard L. Erickson
Lawrence A. Kolze
William R. McCarty Jr.
BY
ATTORNEYS 3,294,290
VALVE ASSEMBLY CONTROLLING FLOW INTO, AND DISCHARGE FROM, A FLUID MEASURING CHAMBER
Howard L. Erickson and Lawrence A. Kolze, Bensenville, and William R. McCarty, Jr., Skokie, Ill., assignors to The Dole Valve Company, Morton Grove, Ill., a corporation of Illinois
Filed Apr. 6, 1965, Ser. No. 446,056
5 Claims. (Cl. 222—335)

This invention relates to liquid measuring devices and more particularly relates to devices for periodically supplying measured quantities of liquid to ice makers and the like.

A principal object of the invention is to provide an improved form of liquid measuring device, which may be efficiently used to supply measured quantities of water to ice makers and the like, and arranged with a view toward utmost simplicity and efficiency in construction and operation.

A further object of the invention is to provide a liquid measuring device having a single valve member movable along a valve chamber and controlling the admission of liquid to the measuring chamber and the release of liquid therefrom, and moved to its liquid releasing position by a solenoid separate from the valve.

A still further object of the invention is to improve upon the liquid measuring devices heretofore in use for supplying liquid to ice makers and the like, utilizing a free sliding pin movable along a valve chamber and moved to a release position by the armature of a solenoid, spaced from the pin when the valve is in position to admit liquid to the measuring chamber, and engaging the pin and positively moving the valve into position to effect the delivery of a measured volume of liquid.

These and other objects of the invention will appear from time to time as the following specification proceeds and with reference to the accompanying drawing wherein:

FIGURE 1 is a top plan view of a liquid measuring device constructed in accordance with the principles of the present invention; and FIGURE 2 is a sectional view taken through the liquid measuring device shown in FIGURE 1 substantially along lines II—II of FIGURE 1.

In the embodiment of the invention illustrated in FIGURES 1 and 2 of the drawing, the liquid measuring device includes generally a measuring chamber 10, a valve body 11 forming one end of said measuring chamber and extending therefrom. The valve body 11 has a liquid passageway 12 extending therefrom in axial alignment with the center of said measuring chamber and having a reduced end portion 13 leading through a wall 15 of a valve chamber 16. The valve chamber 16 has an inlet port 17 leading thereinto at one end thereof and an outlet port 18 in axial alignment with said inlet port and leading from the opposite end of said valve chamber.

A valve pin 19 of a different cross-sectional area than the cross-sectional area of the valve chamber 16 is provided to control the flow of liquid from said inlet port to said passageway and from said passageway through said outlet port, as will hereinafter be more clearly described as this specification proceeds.

The portion of the valve body 11 forming one end of the measuring chamber 10 is of an inverted generally cup-like form having a lower radial flange 21 abutting a radial flange 22 of a generally cylindrical closure member 23 for the cup-like portion of the valve body 11.

As shown in FIGURE 2 the radial flange 21 has a groove 25 extending along its undersurface and receiving an annular beaded portion 26 of a flexible diaphragm 27. The radial flange 22 terminates in an axially extending rim portion 29 extending along the periphery of the flange 21 and crimped or otherwise secured thereto.

The diaphragm 27 extends downwardly along the inner wall of the closure member 23 for a short portion of the depth thereof and upwardly along the outer wall of an inverted cup-like piston member 30. The diaphragm also extends across the top of said piston member and with said piston member forms a movable wall or piston 31 moved to the retracted position shown in FIGURE 2 by fluid entering the measuring chamber 10 through the inlet port 17 and passageway 12, and moved to expel liquid from the measuring chamber 10 upon closing of the inlet port 17 and opening of the outlet port 18 by the bias of a compression spring 32.

The compression spring 32 is seated at one end in the bottom of the closure member 23 and encircles a guide 33 and is seated at its opposite end on the undersurface of the inverted cup-like piston member 30. A guide rod 35 is riveted or otherwise secured to the top surface of the cup-like piston member 30 and extends downwardly along the guide 33 to the outside of the measuring chamber. The projecting end of the guide rod 35 thus forms a means for expelling liquid from the measuring chamber 10 by hand. The end of the guide rod 35 may also be connected with a motion limiting device of a suitable form, such as an adjustable abutment or cam (not shown) to vary the capacity of the measuring chamber 10 and the volume of liquid measured by said chamber and expelled by the spring 32 as the port 17 is closed and the port 18 is opened. The motion limiting means is no part of the present invention so need not herein be shown or described further.

The valve pin 19 has valve means thereon, for controlling the supply of liquid to and the release of liquid from the chamber 10, and is herein shown as being hexagonal in cross-section, although it may be of any desired form as long as it will allow liquid to pass along the wall of the valve chamber from the inlet port 17 to the passageway 12. The pin 19 is shown as having a stem 36 extending towards the port 17 and as having a head 37 on its end. The head 37 and stem 36 are covered by a resilient cup 39 snapped thereto and forming a valve engageable with the inlet port 17, to block the flow of fluid therethrough upon deenergization of a coil 40 of a solenoid 41. The inlet port 17 is shown as leading through a fitting 42, partially recessed in the valve body 11 and sealed thereto, and having a threaded nipple 43 extending outwardly therefrom. A screen 44 is carried in the nipple 43 to screen foreign matter from the water entering the valve chamber 15.

The end of the pin 19 facing the port 18 is shown as being tapered to form a generally frusto-conical end portion having a valve end face 45, engageable with a resilient valve seat 46, to block the flow of fluid through the outlet port 18. The valve face 45 has an actuator pin 47 extending therefrom through the outlet port 18 and adapted to be engaged by an armature 48 of the solenoid 41. A spring 49 is seated in an inner annular groove formed in the fitting 42 at one end and on the pin 19 at its opposite end and biases the valve face 45 into engagement with the seat 46.

It should here be understood that while I have shown a spring 49 for biasing the pin 19 to close the outlet port 18, a spring need not necessarily be used and the valve can be moved to its closed position by the pressure of fluid entering the inlet port 17. The inlet fitting 43 is retained to the valve body 11 as by a bracket 50 extending about said fitting and engaging the flanged portion thereof and retained to the valve body as by machine screws 52, 52. The bracket 50 serves as a bracket to mount the measuring device on the wall of a refrigerator or other apparatus where the measuring device is to be used.

The opposite end of the valve body 11 from the fitting 42 is shown as having a recessed portion or outlet chamber 51 formed therein, from which leads an outlet fitting 53. The chamber is closed by a guide 55 for the armature 48. The guide 55 has a cup-like inner end portion 56 registering with the chamber 51 and sealed to the valve body as by an annular seal 57. A clamping ring 58, clamped to the valve body as by machine screws, is provided to retain the guide 55 in position. A compression spring 59 is interposed between a shouldered portion 60 of the cup-like portion 56 of the guide 55 and a snap ring 61 on the armature 48 to bias the armature into engagement with the pin 47 and open the port 18 for the discharge of liquid through the outlet fitting 53. A stop 62 closes the outer end of the guide 55 and is mounted at its outer end in a bracket 63 as by a snap ring 64. The bracket 63 also forms a support and flux path for the coil 41 of the solenoid, which is herein shown as being an encapsulated type of coil, encapsulated in the insulating material therefor.

The solenoid coil 40 is shown in FIGURE 2 in its energized condition with armature in engagement with the stop 62. In this position of the solenoid coil, the spring 49 will move the valve face 45 into engagement with the seal 46. Liquid may then enter the inlet port 17 and flow along the valve pin 19 and enter the measuring chamber 10 through the inlet 12. This will effect movement of the piston 31 against the spring 32 to the limit of travel thereof, limited by engagement of the end of the cup-like piston member 30 with the guide 33. The device is then ready to supply a measured volume of liquid, such as water, to an ice maker and the like. As the solenoid coil 40 is deenergized, the spring 59 will move the armature 48 into engagement with the actuator pin 47 and move the valve face 45 away from its resilient seal and move the valve 39 into position to close the inlet port 17. The spring 32 will then move the piston 30 and diaphragm 31 toward the passageway 12 and force a measured volume of fluid through the fitting 53, in a conventional manner.

It may be seen from the foregoing that the valve pin or plug 19 is separate from the armature 47 and that the opposite ends of said pin serve to control the supply of liquid to the measuring chamber 10 and the release of liquid therefrom. The construction just described simplifies the valving arrangement and operating mechanism and, therefore, makes it unnecessary to directly connect the valve with its armature and provides a fast and positive acting valving arrangement for efficiently controlling the filling of the measuring chamber 10 and the release of liquid therefrom. The present form of the invention, therefore, materially reduces the parts required and thus increases the efficiency and operation thereof, and reduces the cost of manufacture of the device.

While we have herein shown and described one form in which the invention may be embodied, it may readily be understood that various variations and modifications in the invention may be attained without departing from the spirit and scope of the novel concepts thereof.

We claim as our invention:

1. A liquid measuring device comprising,
a measuring chamber,
a valve body forming one end of said chamber,
a piston forming the opposite end of said chamber and biased to move toward said valve body,
a valve chamber in said valve body,
an inlet port leading into said chamber adjacent one end thereof,
an outlet port leading from said valve chamber adjacent the opposite end thereof,
a passageway in said valve body leading from said measuring chamber and having communication with said valve chamber, intermediate the ends thereof,
a valve pin movable along said valve chamber and having a cross-sectional area less than the cross-sectional area of said valve chamber, to accommodate the flow of liquid therealong, and having a valve face on one end thereof adapted to block the flow of liquid through said inlet and a valve face on the opposite end thereof adapted to block the flow of liquid through said outlet, upon the opening of said inlet,
spring means seated in said valve chamber and biasing said valve in the direction of the flow of liquid thereinto, to block the passage of liquid through said outlet port,
a solenoid mounted on said valve body and having an armature facing said pin and spaced therefrom,
said valve having a projecting portion extending through said outlet and adapted to be engaged by said armature to effect movement of said valve pin in position to close said inlet and open said outlet.

2. In a liquid measuring device comprising,
a measuring chamber,
a valve body forming an end of said chamber,
a piston forming the opposite end of said chamber,
spring means biasing said piston to move toward said valve body,
a valve chamber in said valve body,
an inlet port leading into said valve chamber through one end thereof,
an outlet port leading from said valve chamber through the opposite end thereof and in axial alignment with said inlet,
a passageway in said valve body leading through the wall thereof between said inlet and said outlet and having communication with said measuring chamber,
a valve pin of lesser cross-sectional area than the cross-sectional area of said measuring chamber, movable along said measuring chamber,
a resilient valve at one end of said pin engageable with said inlet port,
spring means biasing said resilient valve away from said inlet port,
a valve at the opposite end of said pin engageable with said outlet port,
a projecting actuator member leading from said pin through said outlet port,
an armature in axial alignment with said actuator member,
spring means engaging said armature with said actuator member to effect the closing of said inlet port and the opening of said outlet port and the dispensing of a measured volume of liquid from said measuring chamber,
and an electrically energizable coil moving said armature against its biasing spring and accommodating the movement of said valve pin into position to close said outlet port and accommodate the free flow of liquid thereby through said passageway to fill said measuring chamber.

3. A liquid measuring device comprising,
a measuring chamber,
a valve body forming one end of said measuring chamber,
a piston forming the opposite end of said measuring chamber,
spring means biasing said piston to move toward said valve body,
a valve chamber in said valve body extending perpendicular to the direction of movement of said piston,
an inlet port leading into said valve chamber through one end thereof,
an outlet port leading from said valve chamber through the opposite end thereof,
a passageway in said valve body leading from said measuring chamber and having communication with said valve chamber between said inlet port and said outlet port, a pin of lesser cross-sectional area than the cross-sectional area of said valve chamber, mounted in said valve chamber for movement therealong, a resilient valve on one end of said pin, a valve face on the opposite end of said pin, an actuator member extending from said valve pin and valve face through said outlet port, an armature on the outside of said valve body and spaced from said actuator member, spring means moving said armature to engage said actuator member and move said valve pin to engage the resilient valve thereon with said inlet port, said valve chamber having a resilient seat therein extending about said outlet port, and other spring means moving said pin to engage the valve face thereof with said resilient seat and block the flow of fluid through said outlet port and accommodate the filling of said valve chamber through said inlet port and passageway.

4. A liquid measuring device comprising, a measuring chamber, a valve body forming one end of said measuring chamber, a resilient diaphragm sealed to the end of said valve body, a piston movable along said measuring chamber and engaging said diaphragm, a spring moving said piston and diaphragm toward said valve body, a measuring passageway leading from said measuring chamber through said valve body in axial alignment therewith, a valve chamber at right angles to said measuring chamber and having communication with said measuring passageway through a wall of said valve chamber, an inlet fitting at one end of said valve chamber having an inlet port leading into said chamber, an outlet port leading through the opposite end of said valve chamber and having a resilient seat in said chamber extending about said port, a valve pin movable along said measuring chamber and having a reduced diameter head at one end having a cup-like valve extending thereabout for engagement with said inlet port, to block the flow of liquid into said valve chamber, a spring seated on said fitting and engaging said pin and biasing said resilient valve in position to accommodate the flow of liquid through said inlet port, a valve face on the opposite end of said pin engageable with said resilient seat to block the flow of liquid through said outlet port, a solenoid mounted on the outside of said valve body and having a solenoid coil and an armature guided for movement therealong in axial alignment with said valve chamber, spring means biasing said armature to move toward said valve chamber, energization of said coil moving said armature in position to accommodate the closing of said outlet port and the opening of said inlet port, and an actuator member extending from said valve face through said outlet port and spaced from the end of said armature when in its attracted position, and engaged by said armature upon deenergization of said coil to effect closing of said inlet port and opening of said outlet port.

5. A liquid measuring device comprising:

a measuring chamber, a passageway leading into said chamber through one end thereof, a piston at the opposite end of said chamber biased to move toward said passageway to force a measured quantity of liquid therethrough, a valve body forming an end wall of said chamber and having said passageway leading axially therethrough, a valve chamber in said valve body in communication with said passageway intermediate the ends thereof, an inlet into said valve chamber at one end thereof, an outlet from said valve chamber adjacent the opposite end thereof, a valve member disposed intermediate said inlet and said outlet and adapted to move along said valve chamber, a first biasing means for biasing the said valve member into a sealing engagement with the said outlet, a second biasing means having greater biasing force than the first biasing means and engageably disposed with the said valve member for biasing the said valve member in a sealing engagement with the said inlet, and force means for removing the biasing force of the said second biasing means upon energization of the said force means.

References Cited by the Examiner

UNITED STATES PATENTS

| | | | |
|---|---|---|---|
| 1,979,428 | 11/1934 | Wheeler | 222—335 X |
| 2,609,974 | 9/1952 | Brous | 222—453 X |
| 2,793,793 | 5/1957 | Sampson | 222—335 |
| 2,830,743 | 4/1958 | Rimsha et al. | 222—335 |
| 2,959,341 | 11/1960 | Noakes | 222—453 X |
| 3,162,336 | 12/1964 | Erickson | 222—335 X |
| 3,201,002 | 8/1965 | Williams | 222—335 X |

RAPHAEL M. LUPO, *Primary Examiner.*